US012191638B2

(12) United States Patent
Blankmeister et al.

(10) Patent No.: US 12,191,638 B2
(45) Date of Patent: Jan. 7, 2025

(54) PRECHAMBER SPARK PLUG HAVING IMPROVED IGNITION PROPERTIES

(71) Applicant: Robert Bosch GmbH, Stuttgart (DE)

(72) Inventors: Matthias Blankmeister, Heiligenhaus (DE); Thomas Steidten, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/571,350

(22) PCT Filed: Jun. 22, 2022

(86) PCT No.: PCT/EP2022/067035
§ 371 (c)(1),
(2) Date: Dec. 18, 2023

(87) PCT Pub. No.: WO2023/274813
PCT Pub. Date: Jan. 5, 2023

(65) Prior Publication Data

US 2024/0283224 A1 Aug. 22, 2024

(30) Foreign Application Priority Data

Jun. 28, 2021 (DE) ..................... 10 2021 206 659.3

(51) Int. Cl.
*H01T 13/54* (2006.01)
*H01T 21/02* (2006.01)

(52) U.S. Cl.
CPC ............. *H01T 13/54* (2013.01); *H01T 21/02* (2013.01)

(58) Field of Classification Search
CPC ................................ H01T 13/54; H01T 21/02
See application file for complete search history.

(56) References Cited

FOREIGN PATENT DOCUMENTS

| | | | |
|---|---|---|---|
| DE | 102018221919 | A1 | 6/2020 |
| DE | 102019204169 | A1 | 10/2020 |
| DE | 102020202385 | A1 | 3/2021 |
| EP | 2525452 | A1 | 11/2012 |
| WO | 2007092972 | A1 | 8/2007 |

OTHER PUBLICATIONS

International Search Report for PCT/EP2022/067035, Issued Oct. 25, 2022.

*Primary Examiner* — Mary Ellen Bowman
(74) *Attorney, Agent, or Firm* — NORTON ROSE FULBRIGHT US LLP; Gerard A. Messina

(57) ABSTRACT

A prechamber spark plug. The prechamber spark plug includes a housing having an external thread with a start of thread, a central electrode and a ground electrode, the central electrode and the ground electrode being arranged in a prechamber, and a cap that closes the prechamber in the direction of a combustion chamber, through-holes for a connection between the prechamber and an outer side of the prechamber spark plug being configured in the housing.

13 Claims, 5 Drawing Sheets

PRECHAMBER SPARK PLUG HAVING IMPROVED IGNITION PROPERTIES

FIELD

The present invention relates to a prechamber spark plug having improved ignition properties, and in particular to a prechamber spark plug having a flattened cap. The present invention further relates to a method of manufacturing a prechamber spark plug.

BACKGROUND INFORMATION

Prechamber spark plugs are available in the related art in a variety of embodiments. A prechamber of the prechamber spark plug is typically defined by a housing region and a cap. Through-holes are provided in the cap that allow gas to be exchanged between the prechamber and the outer side of the prechamber spark plug, typically to a combustion chamber of an internal combustion engine. During compression of the internal combustion engine, a fresh mixture of fuel and air flows into the prechamber and has to enter the region of the electrodes where a spark is produced during ignition. Due to a strong volume increase of the fuel gases in the prechamber after ignition, a strong pressure increase occurs, which in turn allows the hot gases to escape from the through-holes at high speed in the form of flares. As a result, large portions of the combustion chamber may be ignited simultaneously. To ensure said ignition in the combustion chamber, the through-holes in the cap must be properly aligned when the prechamber spark plug is screwed in. That is to say, the cap must be aligned relative to a thread beginning of an external thread of the prechamber spark plug before the cap is attached to the housing. However, this is associated with a relatively high degree of uncertainty regarding proper positioning, which in later operation of the prechamber spark plug can lead to degraded ignition behavior in the combustion chamber of the internal combustion engine.

SUMMARY

A prechamber spark plug according to the present invention may have an advantage that a highly precise alignment of through-holes of the prechamber spark plug relative to an external thread is possible. Thus, the through-holes of the prechamber spark plug in the mounted state in an internal combustion engine may have an accurate orientation to the combustion chamber. This results in a defined exit geometry and alignment of torch jets through the through-holes and thus an excellent, practically complete ignition of a fuel-air mixture in a combustion chamber of the internal combustion engine. According to an example embodiment of the present invention, an external thread and through-holes for the prechamber spark plug can be produced in one clamping operation. This particularly also results in suitability for large-scale industrial manufacturability of the prechamber spark plugs, because in the future, an increased use of prechamber spark plugs in mobile internal combustion engines is planned. Furthermore, very good cooling of thermally highly stressed regions around the through-holes is possible. According to the present invention, this is achieved in that the prechamber spark plug comprises a housing having an external thread with a start of thread, a central electrode, and a ground electrode disposed in a prechamber. The prechamber spark plug further comprises a cap that closes the prechamber towards a combustion chamber. In the housing, in addition to the external thread, through-holes are configured for a connection between the prechamber and an outer side of the prechamber spark plug in the direction towards the combustion chamber. Thus, the external thread and the through-holes can be produced in one clamping operation of the housing. The through-holes no longer have to be provided in the cap, as a result of which the alignment problems that exist in the related art between the cap having the through-holes and the start of thread of the external thread can be eliminated. Because the through-holes are provided in the housing, particularly good cooling of the thermally highly stressed regions around the through-holes is also possible due to the direct connection to the cooled housing.

Preferred further developments of the present invention are disclosed herein.

According to an example embodiment of the present invention, preferably, the cap of the prechamber spark plug is configured as a flat cap, wherein an outer side of the flat cap directed towards the combustion chamber is flat in design. That is to say, an outer side of the cap lies in a plane defined by the outer side.

According to an example embodiment of the present invention, particularly preferably, the housing is configured with a threaded region and a non-threaded region. The non-threaded region adjoins the threaded region and is configured as the last sub-region of the housing in the direction of the combustion chamber. The through-holes connecting the prechamber to the combustion chamber are configured in the non-threaded region. The prechamber spark plug according to the present invention can thus be produced particularly simply and inexpensively.

According to an example embodiment of the present invention, preferably, the non-threaded region has a lesser thickness than the threaded region. This in particular allows better cooling to take place in the direction towards the thicker threaded region, so that thermal problems can be prevented, in particular adjacent to the through-holes. In particular, the thermal inertia of the portion of the prechamber spark plug present in the combustion chamber may be reduced, which in turn counteracts unwanted glow ignition or auto-ignition.

Alternatively, according to an example embodiment of the present invention, the non-threaded region may also have an equal or greater thickness than the threaded region. For one thing, a thickening of the non-threaded region of the housing may influence the prechamber volume, a key parameter in the design of the prechamber spark plug for an internal combustion engine. For another, such thickening may be utilized for improved flow guidance within the prechamber.

According to an example embodiment of the present invention, particularly preferably, the through-holes are arranged at an obtuse angle to a center axis of the prechamber spark plug. The choice of the obtuse angle particularly determines the exit direction of the torch jets from the through-holes. The selection of the obtuse angle may also improve the gas exchange willingness to replace the gas mixture burned in the prechamber after ignition with fresh gas (fresh fuel and air). To enable individual adaptation of the prechamber spark plug to different combustion chambers of different manufacturers of internal combustion engines, each through-hole in the housing is preferably configured at a different angle to the center axis of the prechamber spark plug. The angle is preferably in a range of 70° to 140°, in particular 95° to 120°.

According to an example embodiment of the present invention, for particularly simple and inexpensive manufacturability, the cap is configured as a flat disc. Discs can be provided at a very low cost and a connection between the cap and the housing can be provided by simple measures, for example a circumferential weld joint. To better fix the cap formed as a disc, the disc preferably comprises an annular shoulder on the outer perimeter by which the disc rests against the housing.

According to a further preferred embodiment of the present invention, the housing comprises a receiving opening in the threaded region for fixing the ground electrode. This places the fixation of the ground electrode in the region of the threaded region of the housing. Thus, the non-threaded region can remain without a receiving opening for the ground electrode, so that positioning of the through-holes in the non-threaded region of the housing is possible without limitations.

According to an example embodiment of the present invention, particularly preferably, the cap is formed without any through-holes. Thus, the cap can preferably be provided as a circular disc, particularly simply and inexpensively. All through-holes are thus disposed in the housing.

Alternatively, according to an example embodiment of the present invention, the cap has exactly one central through-hole, the center point of which is in the center axis of the prechamber spark plug. As a result, it is still possible for the cap to be easily fixed to the housing, since the central through-hole is always correctly positioned, namely in the center axis of the prechamber spark plug. Thus, when fixing the cap to the housing, it is not necessary to pay attention to an exact alignment of the cap relative to the housing; rather the cap can be placed on the housing in any orientation and fixed to the housing.

According to a further preferred embodiment of the present invention, a ground electrode is fixed to the cap. The ground electrode is preferably arranged on the cap such that a center axis of the ground electrode coincides with the center axis of the prechamber spark plug. This, too, ensures that the cap provided with a ground electrode is simply positioned on the housing without an alignment step and then fixed. Thus, incorrect assembly with regard to a geometrical alignment of the cap relative to the housing is excluded, even if a ground electrode is provided on the cap.

Further preferably, according to an example embodiment of the present invention, the cap is formed flat on the outer side, and on an inner side, the cap has a profile for influencing an internal flow in the prechamber. The profile is preferably a conical profile, in particular a symmetrical cone. Thus, the internal flow of the gas in the prechamber may be influenced by the internal profile of the cap during both the gas exchange step and when the ignited gas mixture emerges as flares from the through-holes.

The present invention further relates to a method of manufacturing a prechamber spark plug. According to an example embodiment of the present invention, the method comprises the steps of providing a housing of the prechamber spark plug, wherein an external thread is produced on the housing in a clamping operation of the housing and at least one through-hole for a connection between the prechamber of the prechamber spark plug and an outer side of the prechamber spark plug is introduced in the same clamping operation. A cap can be fixed to the housing before or after the manufacture of the external thread and the through-hole, for example by means of a weld connection. The cap may be manufactured without any through-hole or the cap has a central through-hole that lies in a center axis of the prechamber spark plug and thus does not allow for incorrect positioning of the cap. By producing the external thread with a thread beginning and the at least one through-hole in the housing in one clamping operation, a laborious alignment of a cap relative to the housing can be omitted. The through-holes are always correctly positioned with respect to the start of thread of the external thread, so that a fixation of the cap to the housing is possible without an alignment procedure.

As a result, the prechamber spark plug can in particular be produced as a mass component for use in mobile internal combustion engines simply, with maximum accuracy, and inexpensively.

BRIEF DESCRIPTION OF THE DRAWINGS

Preferred embodiment examples of the present invention are described in detail below with reference to the figures.

DETAILED DESCRIPTION OF EXAMPLE EMBODIMENTS

Figure 1:
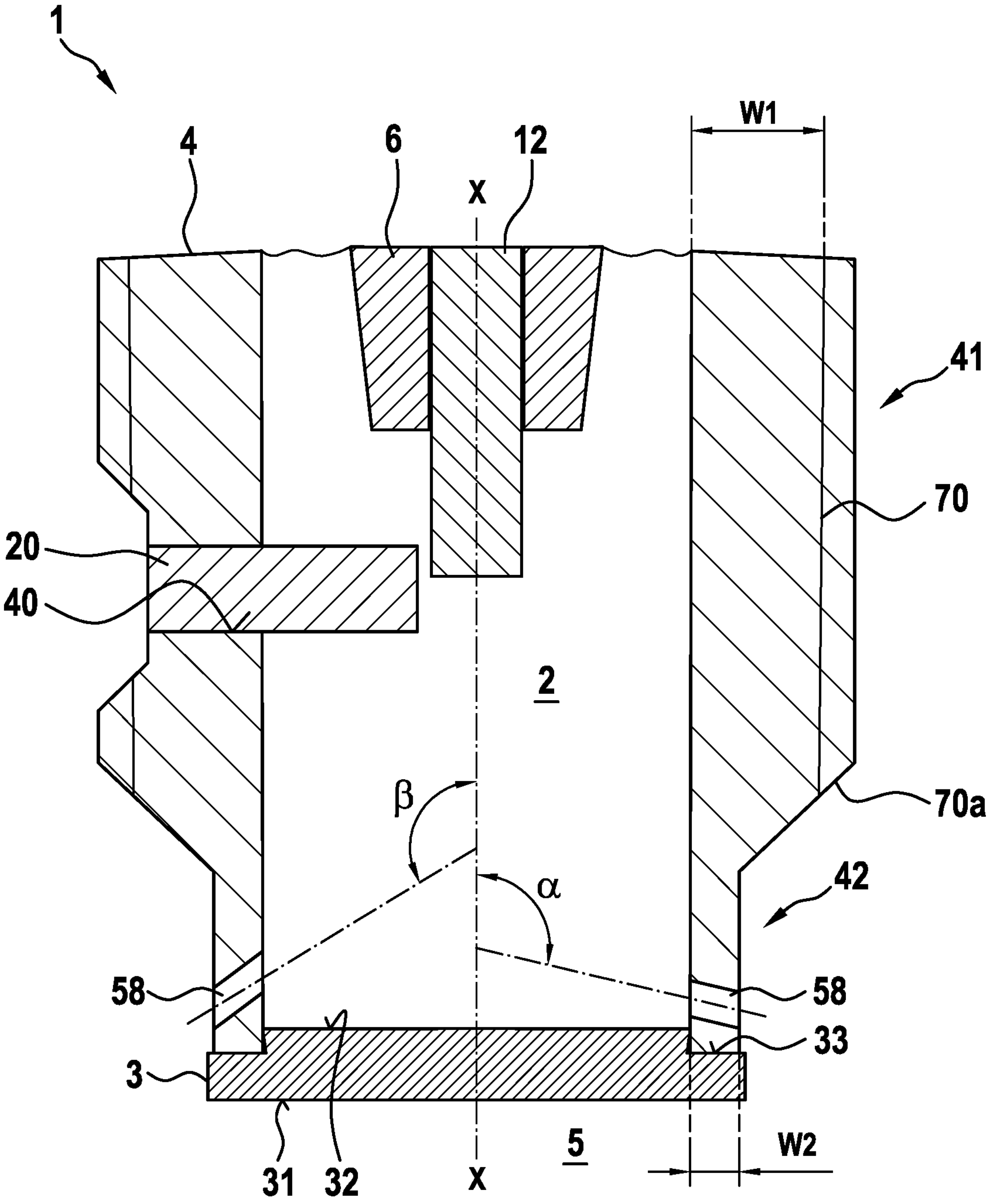
FIG. 1 shows a schematic, simplified partial cross-sectional view of a prechamber spark plug according to a first preferred embodiment example of the present invention.

Referring to FIG. 1, a prechamber spark plug 1 according to a first preferred embodiment example of the present invention will be described in detail below.

As can be seen from FIG. 1, the prechamber spark plug 1 comprises a prechamber 2 and a cap 3. The prechamber 2 is defined by the cap 3 and a housing 4.

The housing 4 has a threaded region 41 and a non-threaded region 42, which directly adjoins the threaded region 41 in the direction toward a combustion chamber 5. An external thread 70 is provided on the threaded region 41. The external thread 70 has a start of thread 70*a*.

The prechamber spark plug 1 is screwed into a corresponding threaded opening of an internal combustion engine by means of the external thread 70 such that the cap 3 is directed towards a combustion chamber 5 of the internal combustion engine.

The prechamber spark plug 1 further comprises a central electrode 12, which is electrically insulated by means of an insulator 6, as well as at least one ground electrode 20.

As can be seen from FIG. 1, the ground electrode 20 is disposed in a receiving opening 40 laterally in the housing 4.

The ground electrode 2 is disposed at a defined distances from the central electrode 12. The ground electrode 20 may be fixed in the housing 4 by means of an interference fit or a weld connection, or both, for example.

As can further be seen from FIG. 1, the cap 3 is configured as a flat, circular disc and has a flat outer side 31 and a flat inner side 32. The cap 3 is configured without any through-hole.

As can be seen from FIG. 1, the through-holes 58 are formed in the non-threaded region 42 of the housing 4. In the example shown, two through-holes 58 are provided, one of the through-holes 58 being disposed at an obtuse angle α to a center axis X-X of the prechamber spark plug, and the second through-hole 58 being disposed at a second obtuse angle β to the center axis X-X. The first obtuse angle α is different from the second obtuse angle β. In this case, it is possible that further through-holes are provided as well.

Preferably, a diameter of the through-holes 58 in the housing 4 is the same in each case.

Alternatively preferably, the diameters of the through-holes are different.

On the cap 3, a recessing shoulder 33 is provided on the outer perimeter, by means of which the cap 3 rests against an end face of the housing. A connection between the cap 3 and the housing 4 is preferably provided by means of a weld connection.

Thus, the through-holes 58 of the prechamber spark plug 1 are not configured in the cap as in the related art, but are provided exclusively in the housing 4. The housing 4 is configured in one piece with the threaded region 41 and the non-threaded region 42. The threaded region 41 has a wall thickness W1, which is greater than a wall thickness W2 of the non-threaded region 42. The wall thickness W1 of the threaded region 41 is here defined without the introduced external thread. The first wall thickness W1 is at least twice as large as the second wall thickness W2.

By providing the external thread 70 with the defined start of thread 70*a* and the through-holes 58 in the housing 4, the external thread 70 and the through-holes 58 can be formed on the housing in one clamping operation. This eliminates the need for the additional effort of aligning the cap relative to the thread beginning of the external thread, which is necessary in the related art in order to properly align the cap, in which the through-holes are typically provided, with the external thread.

In the present first embodiment example, the cap 3 is provided completely free of through-holes or the like and as a flat round disc.

To produce the external thread and the through-holes 58, it is irrelevant whether first the external thread 70 and subsequently the through-holes 58 are produced or vice versa.

Thus, the through-holes 58 may be positioned at the proper positions relative to the external thread so that, when the prechamber spark plug is screwed in, there is an exact positioning of the through-holes 58. This ensures a proper orientation of the through-holes 58 relative to the combustion chamber 5, so that in particular a so-called internal engine flow in the combustion chamber 5 can be used to introduce an unburned fuel-air mixture into the prechamber 2 and purge residual gases from the prechamber 2 and from the prechamber spark plug 2 after ignition. By correctly positioning the through-holes 58, the torch jets created after ignition, which exit the prechamber 2 via the through-holes 58 into the combustion chamber 5, are also directed to the desired positions in the combustion chamber 5 to enable as complete a simultaneous ignition in the combustion chamber 5 as possible.

With regard to the method according to the present invention, it is again noted that the cap 3 can also be applied prior to the introduction of the external thread 70 and the through-holes 58. However, the cap 3 is preferably placed on and fixed to the housing 4 as one of the next steps. A simplified alignment of the lateral ground electrode 20 relative to the central electrode 12 can thereby also be enabled when the prechamber spark plug is open (without cap).

Figure 2:
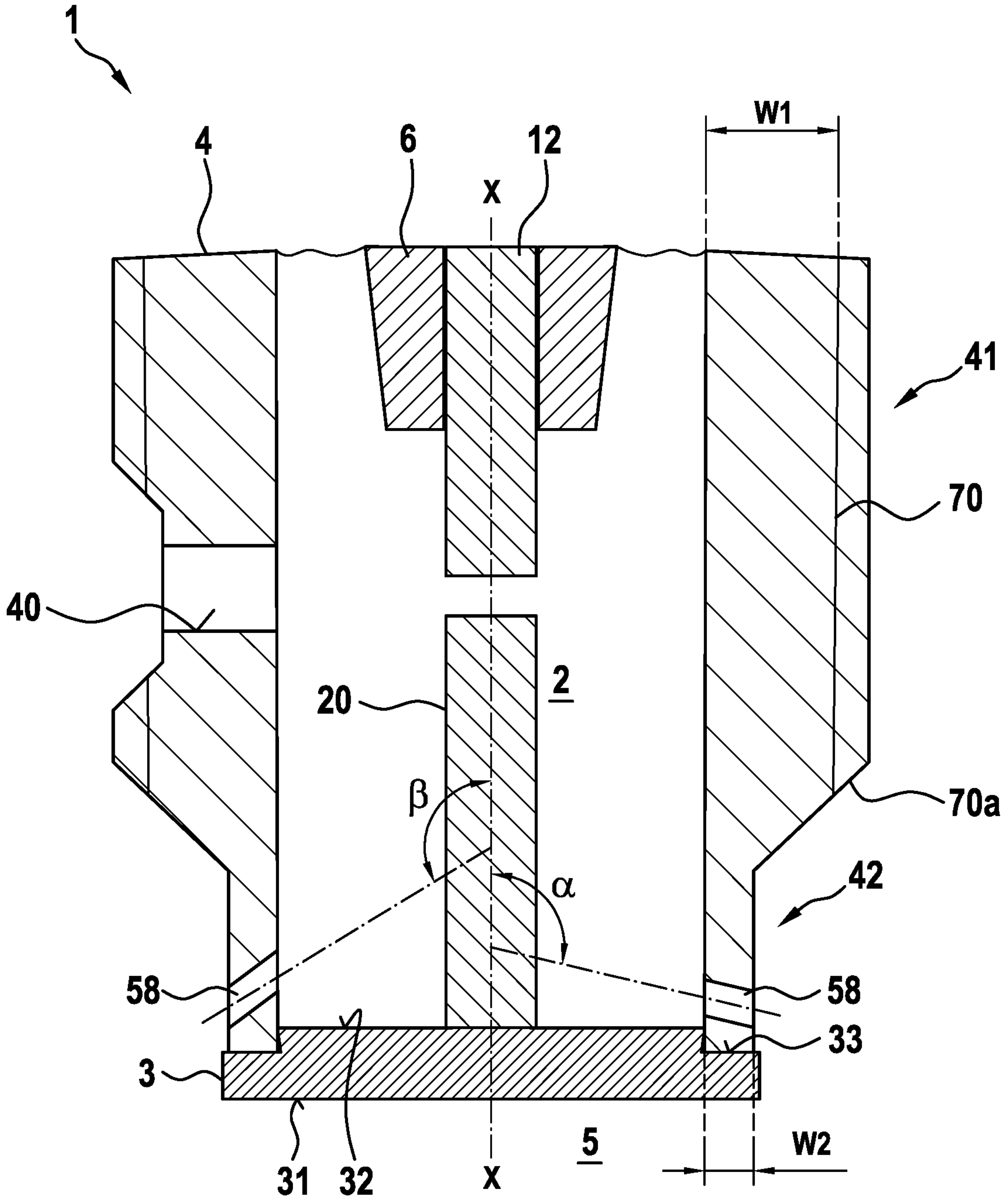
FIG. 2 shows a schematic, simplified partial cross-sectional view of a prechamber spark plug according to a second preferred embodiment example of the present invention.

Referring to FIG. 2, a prechamber spark plug 1 according to a second embodiment example of the present invention is described in detail below. Identical or functionally identical parts bear the same reference numbers as in the first embodiment example.

As can be seen from FIG. 2, in the second embodiment example, the ground electrode 20 is arranged on an inner side 32 of the cap 3. A center axis of the ground electrode 20 and a center axis X-X of the prechamber spark plug 1 coincide in this instance. As can be seen further from FIG. 2, the center axis of the central electrode 12 is also located on the center axis X-X of the prechamber spark plug. Thus, the ground electrode 20 may separately and easily be fixed centrally to the inner side of the cap 30 without alignment issues. In FIG. 2, a lateral receiving opening 40 is also shown in the housing. A further ground electrode 2 may either be fixed here or, alternatively, the receiving opening 40 is used only to check the electrode spacing between the ground electrode 20 and the central electrode 2 and can subsequently be closed with a blind plug or the like. As in the first embodiment example, the cap 3 is formed flat and without any through-hole. All through-holes are provided in the housing 4 with the corresponding advantages with respect to an alignment of the through-holes 58 relative to the thread beginning 70*a* of the external thread 70. Otherwise, the present embodiment example corresponds to the first embodiment example, so that reference can be made to the description given therein.

Figure 3:
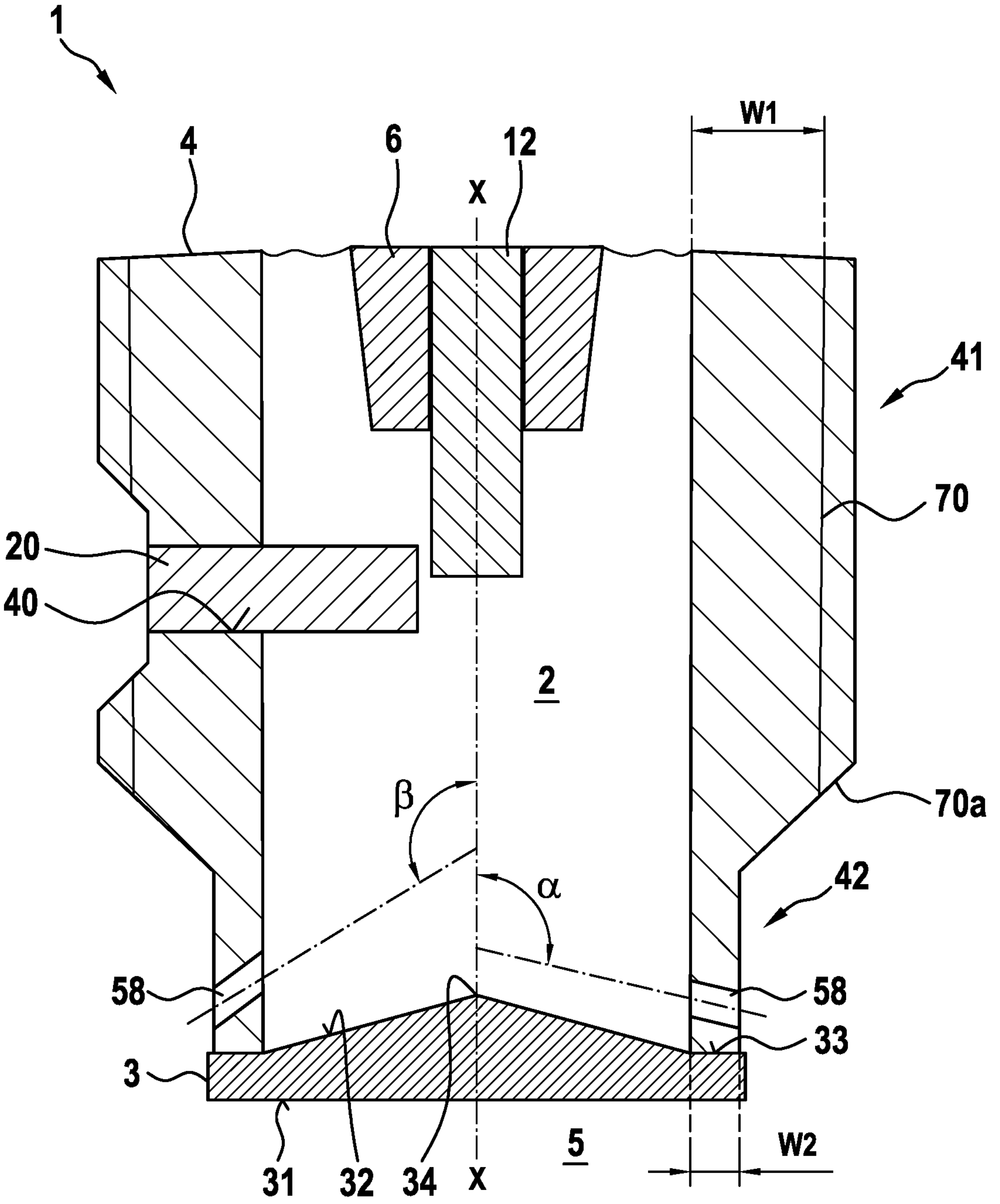
FIG. 3 shows a schematic, simplified partial cross-sectional view of a prechamber spark plug according to a third preferred embodiment example of the present invention.

FIG. 3 shows a prechamber spark plug 1 according to a third embodiment example of the present invention. Identical or functionally identical parts again bear the same reference numbers as in the preceding embodiment examples.

The third embodiment example substantially corresponds to the first embodiment example, while, in contrast to the first embodiment example, the cap 3 is configured differently in the third embodiment example. In the third embodiment example, the cap 3 has a profile on an inner side 32. In the present embodiment example, a symmetric cone 34 is provided on the inner side 32 of the cap 3. An internal flow of the gas in the region of the prechamber 2 can be influenced by the cylindrical cone 34. In particular, a gas exchange can be facilitated by the cone or the torch jets can exit in more targeted fashion from the prechamber 2 into the combustion chamber 5 through the through-holes 58. In the present embodiment example, a conical surface of the symmetric cone is parallel to a centerline with the obtuse angle α of one of the through-holes 58. Otherwise, the present embodiment example corresponds to the first embodiment example, so that reference can be made to the description given therein.

Figure 4:
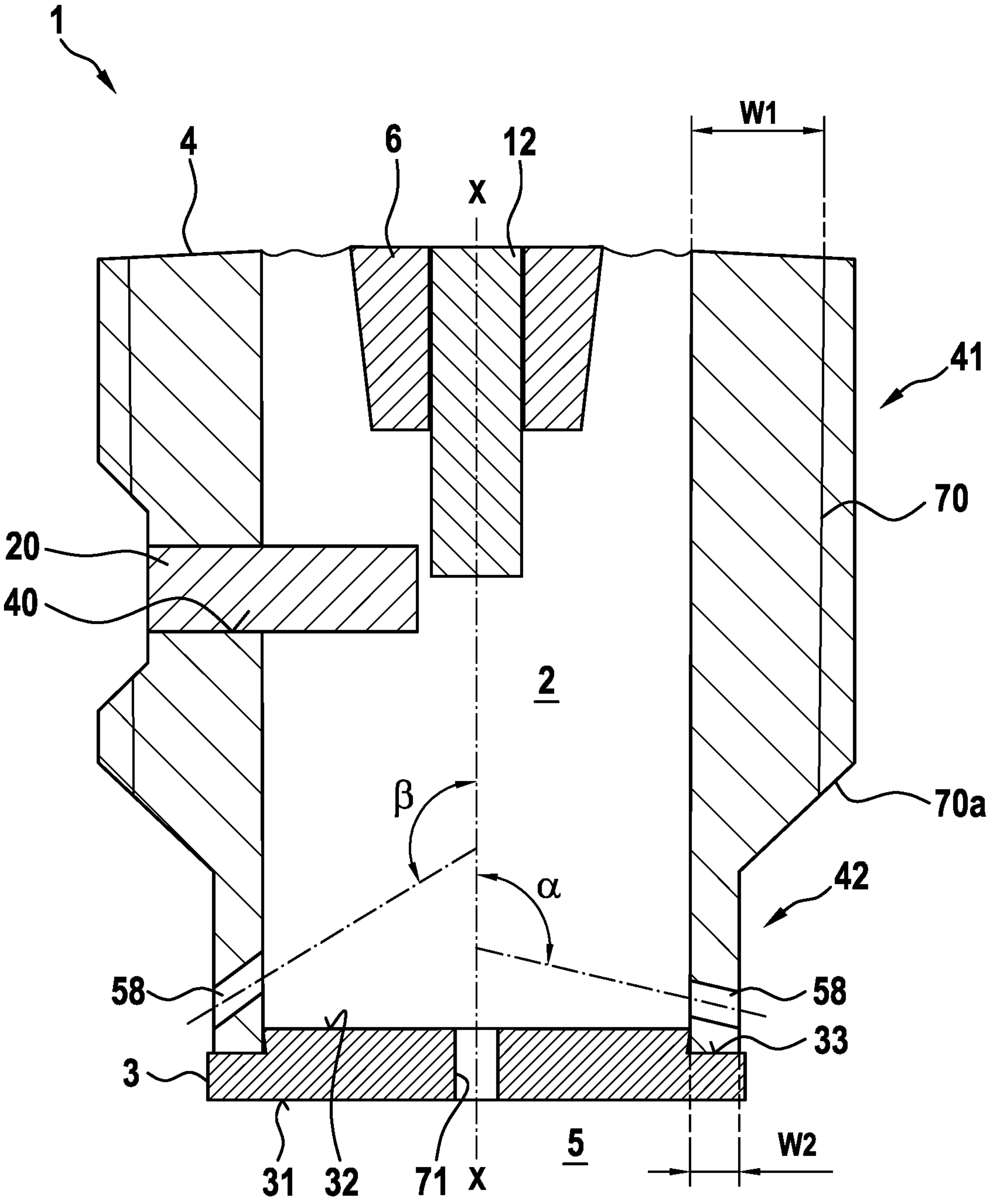
FIG. 4 shows a schematic, simplified partial cross-sectional view of a prechamber spark plug according to a fourth preferred embodiment example of the present invention.

FIG. 4 shows a prechamber spark plug 1 according to a fourth embodiment example of the present invention. Identical or functionally identical parts again bear the same reference numbers as in the preceding embodiment examples.

The fourth embodiment example substantially corresponds to the first embodiment example, while, in contrast to the first embodiment example, a central through-hole 71 is configured in the cap 3. A center axis of the central through-hole 71 in this instance coincides with the center axis X-X of the prechamber spark plug 1. Thus, a position of the through-hole 71 provided in the cap 3 is independent of a mounting position of the cap on the housing 4. By providing the central through-hole 71, in particular a gas exchange between the combustion chamber 5 and the prechamber 2 can be improved and a central torch jet can further be generated from the prechamber 2 into the combustion chamber 5. Otherwise, the present embodiment example corresponds to the preceding embodiment examples, so that reference can be made to the description given therein.

Figure 5:
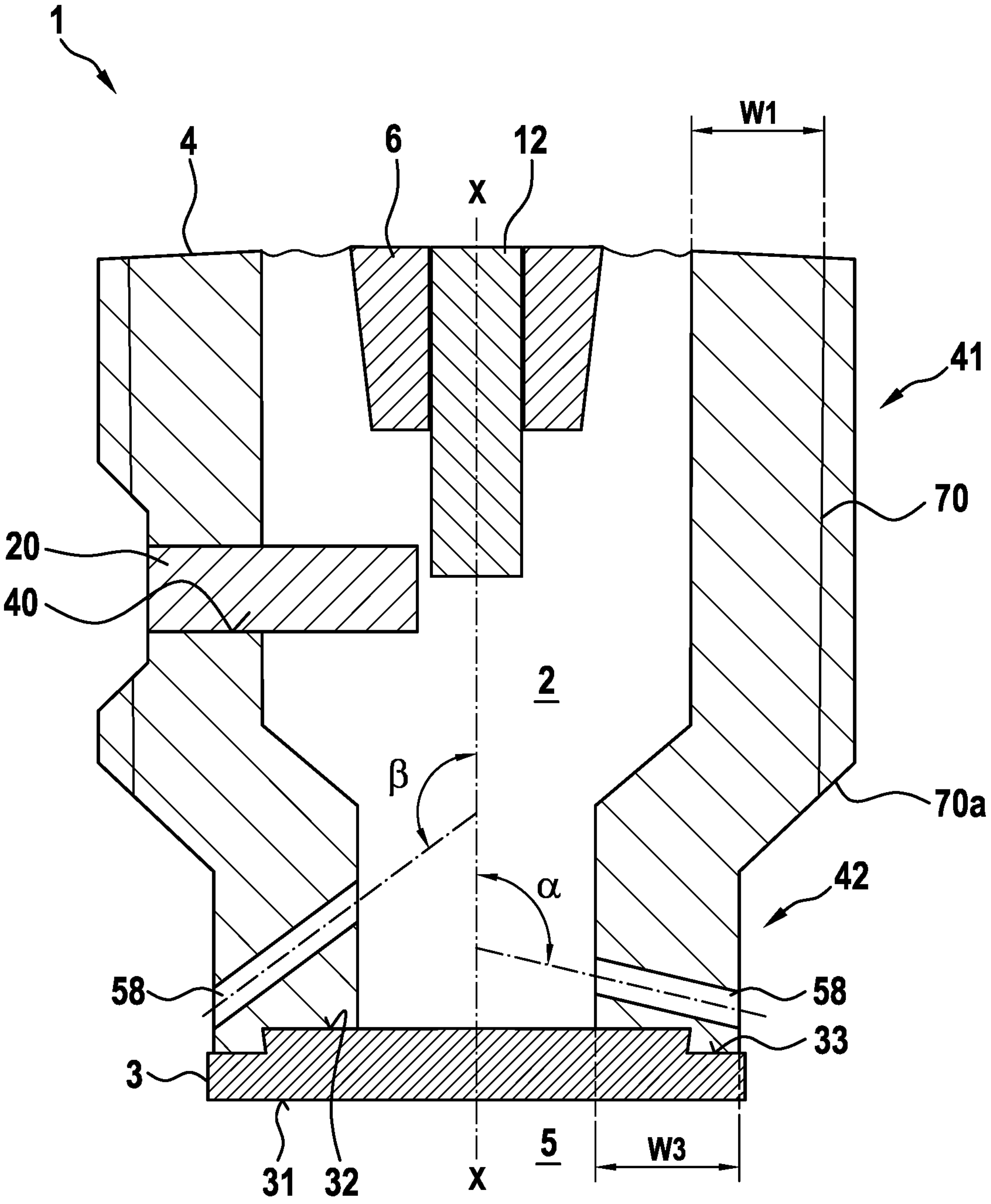
FIG. 5 shows a schematic, simplified partial cross-sectional view of a prechamber spark plug according to a fifth preferred embodiment example of the present invention.

FIG. 5 shows a prechamber spark plug 1 according to a fifth embodiment example of the present invention. Identical or functionally identical parts bear the same reference numbers as in the preceding embodiment example.

The fifth embodiment example substantially corresponds to the first embodiment example, while, in contrast to the first embodiment example, the non-threaded region 42 has a wall thickness W3 equal to a wall thickness W1 of the threaded region 41. In this respect, it is noted that the non-threaded region 42 may also have a wall thickness W3 preferably greater than the wall thickness W1 of the threaded region 41. Increasing the wall thickness W3 of the non-threaded region 42 results in longer through-holes 58. As a result, improved flow guidance within the prechamber 2 is achieved during a gas exchange. Further, a prechamber volume of prechamber 2 may also be affected as the prechamber volume is a key parameter in a design of the prechamber spark plug for a particular internal combustion engine. In the present case, the non-threaded region 42 tapers in the direction towards the center axis X-X. The third wall thickness W3 is in this instance equal to the first wall thickness W1 of the threaded region 41.

Otherwise, the present embodiment example corresponds to the preceding embodiment examples, so that reference can be made to the description given therein.

The invention claimed is:

1. A prechamber spark plug, comprising:

a housing having an external thread with a start of thread;

a central electrode and a ground electrode, wherein the central electrode and the ground electrode are arranged in a prechamber; and a cap closing the prechamber towards a combustion chamber;

wherein through-holes are configured in the housing for a connection between the prechamber and an outer side of the prechamber spark plug, wherein each of the through-holes is disposed at a different angle to a center axis of the prechamber spark plug relative to one another.

2. The prechamber spark plug according to claim 1, wherein the cap is configured as a flat cap and is configured flat to the outer side of the prechamber spark plug.

3. The prechamber spark plug according to claim 1, wherein the housing is formed integrally with a threaded region having the external thread and a non-threaded region, wherein the non-threaded region adjoins the threaded region towards the combustion chamber, and wherein the through-holes are formed in the non-threaded region.

4. The prechamber spark plug according to claim 3, wherein: (i) the non-threaded region has a lesser wall thickness than a wall thickness of the threaded region, or (ii) the non-threaded region has an equal or greater wall thickness than the wall thickness of the threaded region.

5. The prechamber spark plug according to claim 3, wherein the through-holes are arranged at an obtuse angle to the center axis of the prechamber spark plug.

6. The prechamber spark plug according to claim 2, wherein the cap is a flat disc.

7. The prechamber spark plug according to claim 1, wherein the cap includes an annular shoulder on an outer perimeter for fixing to the housing.

8. The prechamber spark plug according to claim 1, wherein the cap is formed without a through-hole and all through-holes are provided in the housing.

9. The prechamber spark plug according to claim 1, wherein the cap includes exactly one central through-hole, and wherein the centerline of on the central through-hole lies in a center axis of the prechamber spark plug.

10. The prechamber spark plug according to claim 1, wherein the ground electrode is fixed to the cap such that a centerline of the ground electrode lies in a center axis of the prechamber spark plug.

11. The prechamber spark plug according to claim 1, wherein the cap is formed flat on an outer side, and the cap has on an inner side a profile for influencing an internal flow in the prechamber, the profile being a conical profile.

12. A method for manufacturing a prechamber spark plug, comprising the following steps:

providing a housing, wherein an external thread with a start of thread is produced on the housing in one clamping operation, and, in the same clamping operation, at least two through-holes for a connection of a prechamber to an outer side of the prechamber spark plug is formed in the housing, wherein each of the through-holes is disposed at a different angle to a center axis of the prechamber spark plug relative to one another.

13. The method according to claim 12, wherein: (i) a cap is fixed to the housing before the external thread and the at least two through-holes are produced in the housing, or (ii) the cap is fixed to the housing after the external thread and the at least two through-holes are produced.

* * * * *